US012717002B2

(12) United States Patent
Liang et al.

(10) Patent No.: US 12,717,002 B2
(45) Date of Patent: Aug. 25, 2026

(54) LASER RADAR

(71) Applicant: Hesai Technology Co., Ltd., Shanghai (CN)

(72) Inventors: Feng Liang, Shanghai (CN); Jie Chen, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 491 days.

(21) Appl. No.: 18/383,429

(22) Filed: Oct. 24, 2023

(65) Prior Publication Data

US 2024/0053444 A1 Feb. 15, 2024

Related U.S. Application Data

(63) Continuation of application No. PCT/CN2021/138323, filed on Dec. 15, 2021.

(30) Foreign Application Priority Data

Apr. 25, 2021 (CN) ........................ 202110446511.6

(51) Int. Cl.

*G01S 7/481* (2006.01)
*G01S 17/42* (2006.01)
*G01S 17/931* (2020.01)

(52) U.S. Cl.

CPC .......... *G01S 7/4815* (2013.01); *G01S 7/4816* (2013.01); *G01S 7/4817* (2013.01); *G01S 17/42* (2013.01); *G01S 17/931* (2020.01)

(58) Field of Classification Search

CPC .... G01S 7/4815; G01S 7/4816; G01S 7/4817; G01S 17/42; G01S 17/931; G01S 7/481;

(Continued)

(56) References Cited

U.S. PATENT DOCUMENTS 8,107,056 B1 1/2012 Riza
2013/0033578 A1 2/2013 Wajs (Continued)

FOREIGN PATENT DOCUMENTS

CN 101975953 A 2/2011
CN 105403877 A 3/2016

(Continued)

OTHER PUBLICATIONS

Notice of Reasons for Refusal mailed Jul. 30, 2024 in connection with Japanese Patent Application No. 2023-561898, 12 pgs. (including translation).

(Continued)

*Primary Examiner* — Francis Geroleo
(74) *Attorney, Agent, or Firm* — Chiesa Shahinian & Giantomasi PC; Xuezheng Wang

(57) ABSTRACT

Provided is a LiDAR comprising a first transmitting unit and a second transmitting unit, which are configured to respectively emit first and second detection laser beams to detect a target object. The LiDAR comprises optical assemblies at both the transmitting end and the receiving end. The optical assemblies comprise transmitting and receiving lenses. The LiDAR comprises a first receiving unit and a second receiving unit configured to respectively receive a first echo and a second echo reflected by an object. The receiving units convert echoes into electrical signals. The first detection laser beam and the second detection laser beam are respectively pass through different optical distances before reaching the transmitting lens, and the first echo and the second echo respectively travel through different optical distances from the receiving lens before reaching the first receiving unit and the second receiving unit.

19 Claims, 10 Drawing Sheets

(58) Field of Classification Search
CPC ...... G01S 7/4863; G01S 7/4914; G01S 17/02; G01S 7/48; G01S 7/4811; G01S 17/894; G02B 13/22
See application file for complete search history.

(56) References Cited

U.S. PATENT DOCUMENTS

| | | | |
|---|---|---|---|
| 2019/0310353 | A1 | 10/2019 | Sun et al. |
| 2020/0088859 | A1 | 3/2020 | Shepard et al. |
| 2020/0142075 | A1 | 5/2020 | Lee |
| 2023/0145710 | A1 | 5/2023 | Xiong et al. |

FOREIGN PATENT DOCUMENTS

| | | | | | |
|---|---|---|---|---|---|
| CN | 106291509 | A | | 1/2017 | |
| CN | 107632487 | A | | 1/2018 | |
| CN | 109814084 | A | | 5/2019 | |
| CN | 111045018 | A | | 4/2020 | |
| CN | 111413687 | A | * | 7/2020 | ............ G01S 7/484 |
| CN | 112162412 | A | * | 1/2021 | ............ G02B 27/48 |
| CN | 112213732 | A | | 1/2021 | |
| CN | 112639514 | A | | 4/2021 | |
| JP | 2013520855 | A | | 6/2013 | |
| KR | 1020140025041 | A | | 3/2014 | |
| WO | 2019022941 | A1 | | 1/2019 | |
| WO | 2020207439 | A1 | | 10/2020 | |

OTHER PUBLICATIONS

Decision to Grant mailed Feb. 4, 2025 in connection with Japanese Patent Application No. 2023-561898, 5 pgs. (including translation).

International Application No. PCT/CN2021/138323, International Search Report dated Mar. 21, 2022.

International Application No. PCT/CN2021/138323, Written Opinion dated Mar. 21, 2022.

EP Application No. EP 21 93 9068, Supplementary European Search Report dated Aug. 1, 2024.

Japanese Patent Application No. 2023-561898, Office Action dated Jul. 30, 2024, English Translation.

Notice of Last Preliminary Rejection mailed May 20, 2026 in connection with Korean Patent Application No. 10-2023-7034094, 15 pgs. (including translation).

* cited by examiner optical path with a long focal length for long-range
and small vertical FOV detection optical path with a short focal length for long-range and short-range detection at a large vertical FOV

LASER RADAR

RELATED APPLICATIONS

The present application claims priority to PCT Application No. PCT/CN2021/138323 filed on Dec. 15, 2021, which claims priority to Chinese Application No. 202110446511.6 filed on Apr. 25, 2021, the entirety of which are herein incorporated by reference.

TECHNICAL FIELD

The present disclosure relates to the technical field of photoelectric detection, and in particular, to a LiDAR capable of performing both a long-range detection and a short-range detection.

BACKGROUND

LiDAR is a radar system that can emit laser beams to detect the position, velocity, and other feature quantities of an object. LiDAR is an advanced detection technique that combines a laser technology with a photoelectric detection technology. Because of its advantages such as high resolution, good concealment, strong resistance to active interference, great low-altitude detection performance, small size, and light weight, LiDAR is widely used in fields such as autonomous driving, intelligent transportation, unmanned aerial vehicles, intelligent robots, and resource exploration.

Currently, there are two representative scenarios for LiDAR's applications in autonomous driving. The first scenario is a detection with a long-range and small vertical field of view (FOV), which is typically required to detect objects beyond 150 m at a vertical FOV of 15° to 40°. This scenario is used for a fine detection of objects at medium to long ranges. The other scenario is a detection with a short-range and large vertical FOV, which typically covers a detection distance of 15 m to 50 m and a vertical FOV of 80° to 105°. This scenario is used for a blind zone detection at a short range. These two applications are typically implemented independently with two types of LiDARs, and then they are installed together on a platform, such as an autonomous vehicle, to achieve a detection without a blind zone at both long and short ranges, as illustrated in FIG. 1.

If these two detection demands can be met by one LiDAR, this will definitely be very meaningful. However, these two detection demands have completely different design requirements for LiDAR. If the detection distance is to be achieved as far as possible, the optical path of the detector needs to be designed with a long focal length. If a large FOV is to be achieved, a short focal length needs to be adopted.

If a vertical FOV of a long-range measuring LiDAR (having an optical path with a long focal length, as illustrated in FIG. 2*a*) is directly increased, this will greatly increase the height of the receiving surface of the detector, as illustrated in FIG. 3*a*, thereby increasing the height of the LiDAR significantly, unfavorable for improving the integration of the LiDAR. In a short-range measuring LiDAR (having an optical path with a short focal length, as illustrated in FIG. 2*b*), if beams are added at the central region to ensure the resolution of the long-range detection, as illustrated in FIG. 3*b*, on one hand, it will be difficult to increase the number of beams at the central region subject to the size of a single detector, and on the other hand, because of the optical path with the short focal length, the long-range detection performance will be hardly improved.

The content of the "Background" merely involves the technology known to the inventor and does not necessarily represent the prior art in the field.

SUMMARY

In view of at least a drawback of the existing technology, the present disclosure provides a LiDAR, comprising:

a first transmitting unit and a second transmitting unit, configured to respectively emit a first detection laser beam and a second detection laser beam for detecting an object;

an optical assembly at a transmitting end and an optical assembly at a receiving end, the optical assembly at the transmitting end comprising a transmitting lens, and the optical assembly at the receiving end comprising a receiving lens; and a first receiving unit and a second receiving unit, configured to respectively receive a first echo and a second echo of the first detection laser beam and the second detection laser beam reflected by the object, and convert them into electrical signals.

The first detection laser beam and the second detection laser beam respectively exit from the first transmitting unit and the second transmitting unit and then travel through different optical distances before reaching the transmitting lens, and the first echo and the second echo respectively travel through different optical distances from the receiving lens before reaching the first receiving unit and the second receiving unit.

According to an aspect of the present disclosure, the first transmitting unit and the second transmitting unit are respectively disposed at different positions from the transmitting lens, and the first receiving unit and the second receiving unit are respectively disposed at different positions from the receiving lens.

According to an aspect of the present disclosure, the first transmitting unit comprises a first array of lasers disposed on a focal plane of the transmitting lens; the second transmitting unit comprises a second array of lasers, and a distance between the second array of lasers and the transmitting lens being less than a focal length of the transmitting lens. The first receiving unit comprises a first array of detectors disposed on a focal plane of the receiving lens; and the second receiving unit comprises a second array of detectors. A distance between the second array of detectors and the receiving lens is less than a focal length of the receiving lens.

According to an aspect of the present disclosure, the second transmitting unit comprises a focus-changing lens at the transmitting end, disposed between the second array of lasers and the transmitting lens. The second detection laser beam passes through the focus-changing lens at the transmitting end and the transmitting lens before exiting to the outside of the LiDAR; and the second receiving unit comprises a focus-changing lens at the receiving end, disposed between the second array of detectors and the receiving lens. The second echo passes through the receiving lens and the focus-changing lens at the receiving end before being incident onto the second array of detectors.

According to an aspect of the present disclosure, the LiDAR further comprises one or more mirrors at the transmitting end and one or more mirrors at the receiving end. The first detection laser beam is reflected by the mirror at the transmitting end and then exiting through the transmitting lens, and the first echo is reflected by the mirror at the receiving end and then incident onto the first array of detectors.

According to an aspect of the present disclosure, the mirror at the transmitting end comprises a mirror with an opening. The first detection laser beam is reflected by the mirror with the opening at the transmitting end and then exits through the transmitting lens, and the second detection laser beam passes through the opening and exits through the transmitting lens. The mirror at the receiving end comprises a mirror with an opening. The first echo is reflected by the mirror at the receiving end with the opening at the receiving end and then is incident onto the first array of detectors, and the second echo passes through the opening and is incident onto the second array of detectors.

According to an aspect of the present disclosure, the LiDAR has a rotating shaft and an opto-mechanical rotor rotatable about the rotating shaft. The opto-mechanical rotor comprises the first transmitting unit, the second transmitting unit, the optical assembly at the transmitting end, the optical assembly at the receiving end, the first receiving unit and the second receiving unit. The opto-mechanical rotor is disposed above the rotating shaft, or the rotating shaft extends through the opto-mechanical rotor.

According to an aspect of the present disclosure, the optical assembly at the transmitting end comprises a first transmitting lens and a second transmitting lens, and the optical assembly at the receiving end comprises a first receiving lens and a second receiving lens. The first detection laser beam exits through the first transmitting lens, and the second detection laser beam exits through the second transmitting lens. The first echo is converged to the first detection unit through the first receiving lens, and the second echo is converged to the second detection unit through the second receiving lens.

According to an aspect of the present disclosure, the LiDAR has a rotating shaft, and the first transmitting lens and the second transmitting lens are disposed at substantially 180 degrees at opposite sides about the rotating shaft. The first receiving lens and the second receiving lens are disposed at substantially 180 degrees at opposite sides about the rotating shaft.

According to an aspect of the present disclosure, the first transmitting lens and the first receiving lens comprise a telecentric lens group.

According to an aspect of the present disclosure, the first detection laser beam and the second detection laser beam correspond to different ranges of vertical fields of view of the LiDAR.

According to an aspect of the present disclosure, the energy of the first detection laser beam is higher than that of the second detection laser beam.

According to an aspect of the present disclosure, both the first transmitting unit and the second transmitting unit comprise a plurality of lasers and multi-channel driving chips, which are disposed on the same PCB. Both the first receiving unit and the second receiving unit comprise a plurality of detectors and multi-channel front-end chips, which are disposed on the same PCB.

According to an aspect of the present disclosure, the LiDAR further comprises a data processing unit coupled with the first transmitting unit, the second transmitting unit, the first receiving unit and the second receiving unit, and the data processing unit is used for fusing detection results of the first detection laser beam and the second detection laser beam to generate a point cloud.

The embodiments of the present disclosure propose a solution that can merge a small-FOV, long-range detection with a large-FOV, short-range detection together. A LiDAR according to an embodiment of the present disclosure is capable of achieving a detection at a short range and large vertical field of view and a detection at a long range and small vertical field of view while ensuring a compact structure.

BRIEF DESCRIPTION OF THE DRAWINGS

The drawings that constitute part of the present disclosure are provided for further understanding the present disclosure, which, along with the embodiments of the present disclosure and description thereof, are used for explaining the present disclosure, and do not make any improper limitation of the same. In the drawings.

DETAILED DESCRIPTION OF THE EMBODIMENTS

Figure 1:
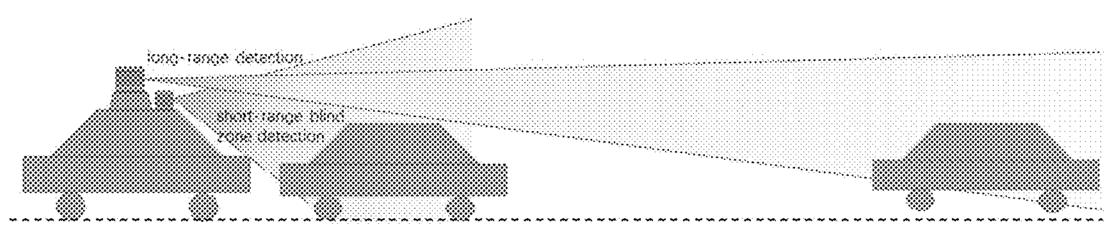
FIG. 1 illustrates a schematic diagram of the combined use of existing LiDARs for a long-range detection and for a short-range detection.
Figure 2A:
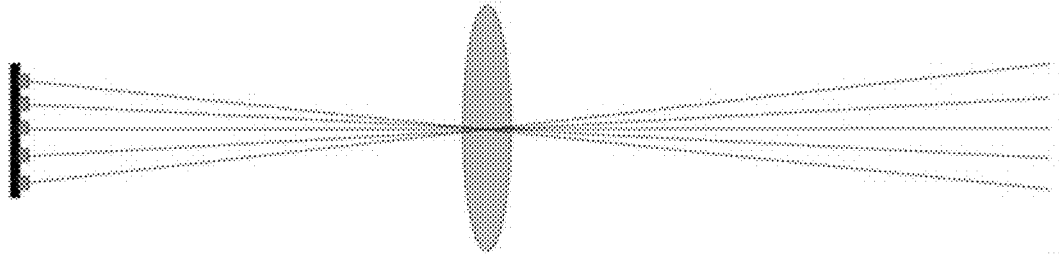
FIG. 2*a* illustrates a schematic diagram of an optical path with a long focal length of a LiDAR for a long-range and small vertical FOV detection.
Figure 2B:
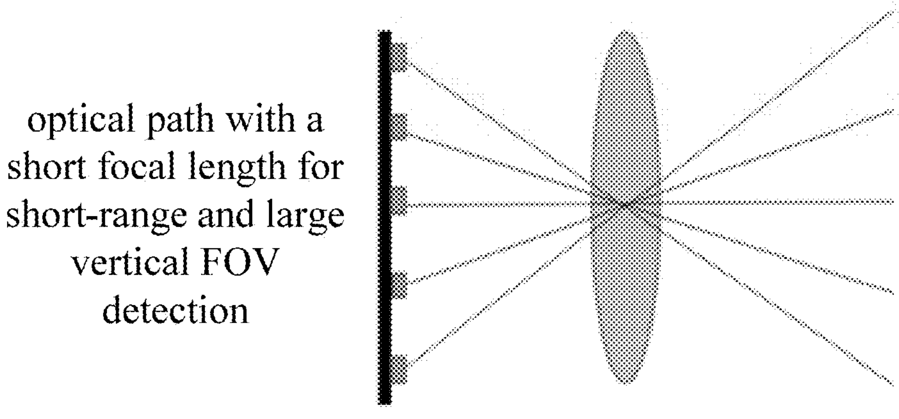
FIG. 2*b* illustrates a schematic diagram of an optical path with a short focal length of a LiDAR for a short-range and large vertical FOV detection.
Figure 3A:
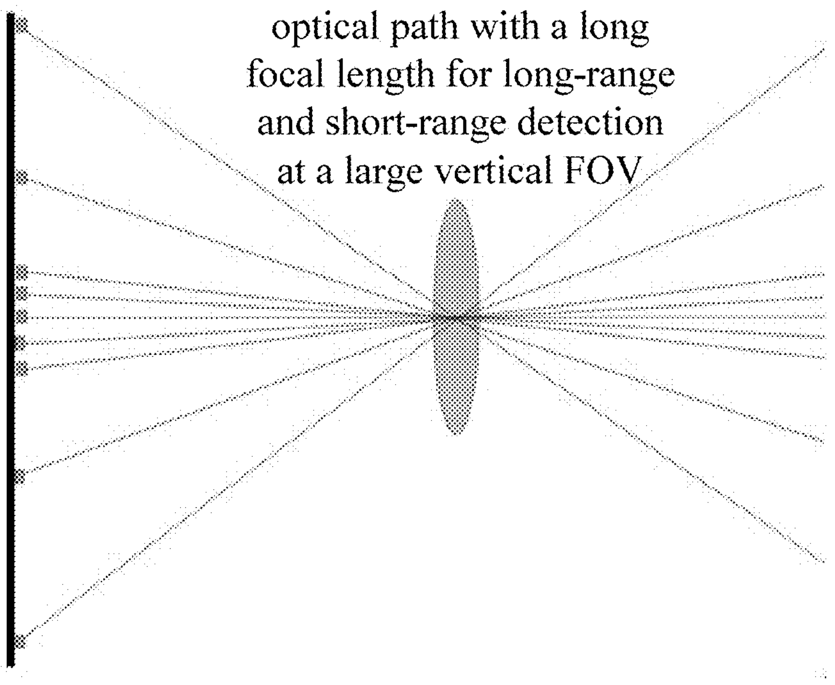
FIG. 3*a* illustrates a schematic diagram of an optical path with a long focal length of a LiDAR satisfying both long-range and short-range detections at a large vertical FOV.
Figure 3B:
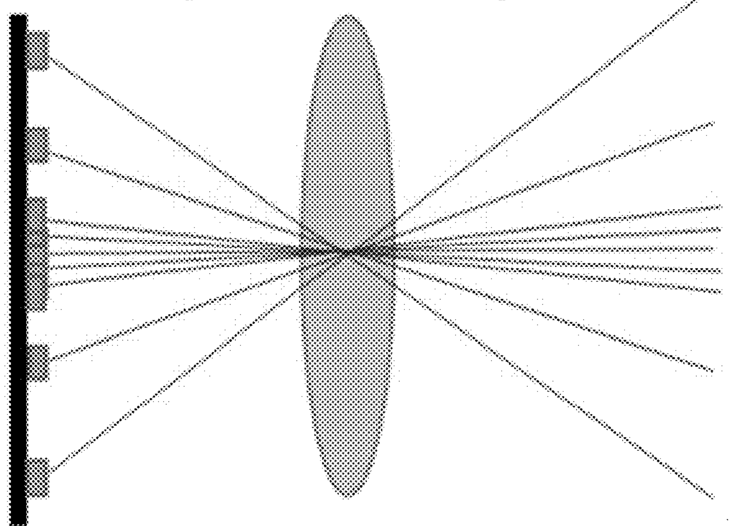
FIG. 3*b* illustrates a schematic diagram of an optical path with a short focal length of a LiDAR satisfying both long-range and short-range detections at a large vertical FOV.

In the following, only some exemplary embodiments are briefly described. The described embodiments may be modified in various different ways without departing from the spirit or scope of the present disclosure, as would be apparent to those skilled in the art. Accordingly, the drawings and descriptions are to be regarded as illustrative and not restrictive in nature.

In the description of the present disclosure, it needs to be understood that the orientation or position relations denoted by such terms as “central” “longitudinal” “latitudinal” “length” “width” “thickness” “above” “below” “front” “rear” “left” “right” “vertical” “horizontal” “top” “bottom” “inside” “outside” “clockwise” “counterclockwise” and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as “first” and “second” are only used for the purpose of description, rather than indicating or suggesting relative importance or implicitly indicating the number of the denoted technical features. Accordingly, features defined with “first” and “second” may, expressly or implicitly, include one or more of the features. In the description of the present disclosure, “plurality” means two or more, unless otherwise defined explicitly and specifically.

In the description of the present disclosure, it needs to be noted that, unless otherwise specified and defined explicitly, such terms as “installation” “coupling” and “connection” should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is “on” or “beneath” a second feature, this may cover direct contact between the first and second features, or contact via another feature therebetween, other than the direct contact. Furthermore, if a first feature is “on”, “above”, or “over” a second feature, this may cover the case that the first feature is right above or obliquely above the second feature, or just indicate that the level of the first feature is higher than that of the second feature. If a first feature is “beneath”, “below”, or “under” a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

On the basis of existing photoelectric devices (lasers and detectors), in order to enable a LiDAR to simultaneously satisfy both long-range and short-range detection performances without significantly increasing the height of the LiDAR, the inventors of the present disclosure conceive that a plurality of transmitting units and a plurality of receiving units can be respectively provided in the LiDAR, for example, two transmitting units and two receiving units. One transmitting unit and one receiving unit are used for detecting objects at long ranges within a smaller FOV, while the other transmitting unit and the other receiving unit are used for detecting objects at short ranges within a larger FOV. The LiDAR has both a transmitting lens and a receiving lens. Different detection laser beams emitted from the plurality of transmitting units travel through different optical distances before reaching the transmitting lens, and then exit into the surrounding environment after passing through the transmitting lens. Echoes generated by an object travel respectively through different optical distances from the receiving lens to different receiving units. Thus, a transmit-receive pair is formed that comprises one transmitting unit and one receiving unit and another transmit-receive pair is formed that comprises the other transmitting unit and the other receiving unit. These two pairs correspond to different focal lengths. Therefore, the LiDAR according to the embodiment of the present disclosure can simultaneously integrate the functions of a large-FOV, short-range detection with a small-FOV, long-range detection.

The preferred embodiments of the present disclosure will be described below with reference to the drawings. It should be appreciated that the preferred embodiments described here are only for the purpose of illustrating and explaining, instead of limiting, the present disclosure.

Figure 4A:
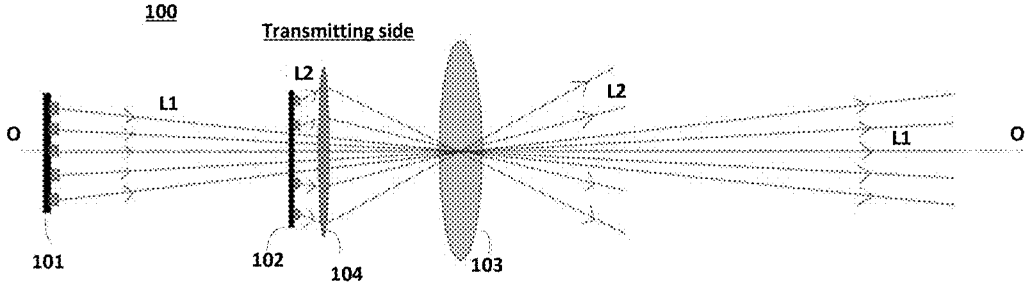
FIG. 4*a* illustrates a schematic diagram of an optical path structure on the transmitting side of a LiDAR according to one embodiment of the present disclosure.
Figure 4B:
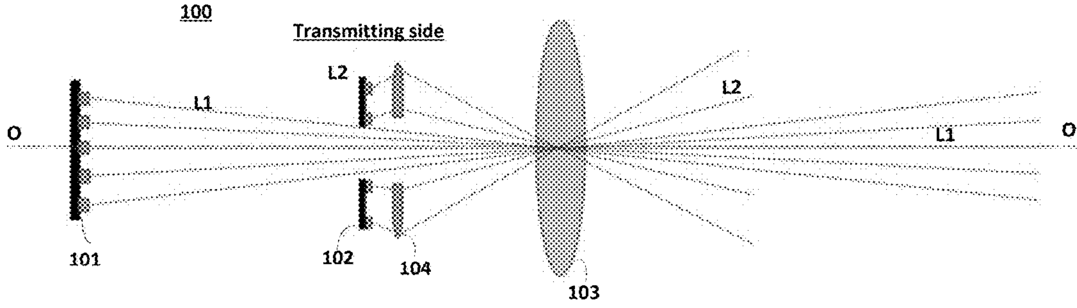
FIG. 4*b* illustrates a schematic diagram of an optical path structure on the transmitting side of a LiDAR according to one embodiment of the present disclosure.
Figure 4C:
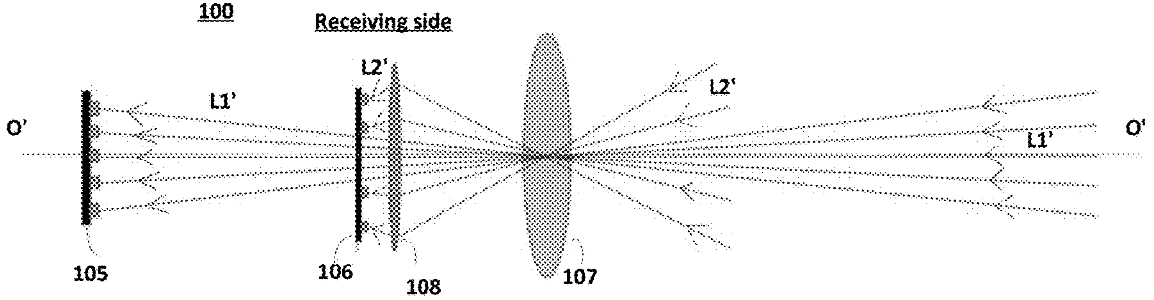
FIG. 4*c* illustrates a schematic diagram of an optical path structure on the receiving side of a LiDAR according to one embodiment of the present disclosure.

FIGS. 4*a*, 4*b* and 4*c* illustrate schematic diagrams of a LiDAR 100 according to one embodiment of the present disclosure. FIGS. 4*a* and 4*b* illustrate an optical path structure on the transmitting side of the LiDAR, and FIG. 4*c* illustrates an optical path structure on the receiving side of the LiDAR. The following is described in detail with reference to the accompanying drawings.

As illustrated in FIG. 4*a*, the LiDAR 100 on its transmitting side comprises a first transmitting unit 101 and a second transmitting unit 102. The first transmitting unit 101 comprises a first array of lasers disposed on a circuit board and used for emitting a first detection laser beam L1, and the second transmitting unit 102 also comprises a second array of lasers disposed on a circuit board and used for emitting a second detection laser beam L2. Lasers in the first and second arrays of lasers can include a vertical cavity surface emitting laser (VCSEL) or an edge emitting laser (EEL).

The LiDAR 100 further comprises an optical assembly at the transmitting end for modulating (e.g., collimating) the first detection laser beam L1 and the second detection laser beam L2, and then enabling them exit into the surrounding environment of the LiDAR for detecting objects. As illustrated in FIG. 4*a*, the optical assembly at the transmitting end comprises a transmitting lens 103 configured to collimate the first detection laser beam L1 and the second detection laser beam L2. As illustrated in FIG. 4*a*, the first detection laser beam L1 and the second detection laser beam L2 exit from the first transmitting unit 101 and the second transmitting unit 102, respectively, and travel through different optical distances before reaching the transmitting lens 103. For example, an optical distance which the first detection laser beam L1 travels through is longer than an optical distance which the second detection laser beam L2 travels through.

In order to enable the first detection laser beam L1 and the second detection laser beam L2 to travel through different optical distances, the first transmitting unit 101 and the second transmitting unit 102 can be respectively disposed at different positions from the transmitting lens 103, for example. Preferably, the first array of lasers of the first transmitting unit 101 is disposed on a focal plane of the transmitting lens 103, and a distance between the second array of lasers of the second transmitting unit 102 and the transmitting lens 103 is less than a focal length of the transmitting lens 103.

According to one preferred embodiment of the present disclosure, as illustrated in FIG. 4*a*, the LiDAR further comprises a focus-changing lens 104 at the transmitting end disposed between the second array of lasers of the second transmitting unit 102 and the transmitting lens 103. The second detection laser beam L2 passes through the focus-changing lens 104 at the transmitting end and the transmitting lens 103 and exits to the outside of the LiDAR. As illustrated in FIG. 4*a*, the second detection laser beam L2 undergoes a certain change in its direction or divergence after passing through the focus-changing lens 104 at the transmitting end. Then, the second detection laser beam L2 is incident onto the transmitting lens 103 and exits to the outside of the LiDAR. Preferably, the second array of lasers of the second transmitting unit 102 is located on a focal plane of a lens group formed by the focus-changing lens 104 at the transmitting end and the transmitting lens 103. An equivalent focal length of the lens group formed by the focus-changing lens 104 at the transmitting end and the transmitting lens 103 is smaller than the focal length of the transmitting lens 103.

Additionally, FIGS. 4*a*, 4*b* and 4*c* are not only schematic diagrams of the LiDAR 100 according to one embodiment of the present disclosure, and FIGS. 4*a* and 4*b* are also schematic diagrams of a coaxial arrangement of the first transmitting unit 101 and the second transmitting unit 102 on the transmitting side, in which both the first transmitting unit 101 and the second transmitting unit 102 are arranged along an optical axis O of the transmitting lens 103. The coaxial arrangement of the first transmitting unit 101 and the second transmitting unit 102 can be implemented in different ways. For example, an opening can be made on the circuit board of the second transmitting unit 102, and another opening can be made at the center of the focus-changing lens 104 at the transmitting end. These openings allow the first detection laser beam L1 to pass through. Therefore, the first detection laser beam L1 is not modulated by the focus-changing lens 104 at the transmitting end. In this case, the first array of lasers of the first transmitting unit 101 can be disposed relatively densely, and located substantially in a middle position of the circuit board; and the second array of lasers of the second transmitting unit 102 can be disposed relatively sparsely, and located substantially in an edge position of the circuit board. Additionally, or alternatively, as illustrated in FIG. 4*b*, the second transmitting unit 102 can also be divided into two parts spaced from each other, and the focus-changing lens 104 at the transmitting end can also be divided into two parts spaced from each other. A middle spacing region of the second transmitting unit 102 and a middle spacing region of the focus-changing lens 104 at the transmitting end can be used for allowing the first detection laser beam L1 to pass through.

Additionally, the aforesaid embodiments can also be combined by, for example, making an opening in the middle of the circuit board of the second transmitting unit 102 and dividing the focus-changing lens 104 at the transmitting end into two parts; or vice versa.

Additionally, those skilled in the art can also conceive of using a microlens array (MLA) to implement the focus-changing lens 104 at the transmitting end. For example, a microlens is disposed downstream of an optical path of each laser in the second array of lasers of the second transmitting unit 102, such that the second detection laser beam L2 is modulated by the microlens and then projected to the transmitting lens 103. In addition to this, other arrangement ways can also be conceived, which will be described in detail in the following embodiments.

In the structures of FIGS. 4*a* and 4*b*, the transmitting lens 103 can adopt a typical design for a LiDAR for a long-range detection with a relatively large focal length, such that the first array of lasers of the first transmitting unit 101 is directly disposed at the focal plane of the transmitting lens 103, which can conveniently achieve a high beam number and a high resolution within a small FOV range. One focus-changing lens 104 at the transmitting end is added at the second transmitting unit 102. A focal length of the lens group formed by the focus-changing lens 104 at the transmitting end and the transmitting lens 103 is relatively small, which is smaller than the focal length of the transmitting lens 103. Therefore, a short-range detection and scanning at a large FOV can be implemented, and the height of the transmitting surface of the lasers will not be very great at the same time, which thus can achieve a compact structure. Preferably, the first detection laser beam L1 (a long-range detection beam) and the second detection laser beam L2 (a short-range detection beam) do not overlap in the vertical field of view, and emitted lights of lasers for short-range and long-range detections have different energies. According to one preferred embodiment of the present disclosure, the energy of the first detection laser beam L1 for a long-range detection is higher than that of the second detection laser beam L2 for a short-range detection.

As illustrated in FIG. 4*c*, the LiDAR 100 on its receiving side comprises a first receiving unit 105 and a second receiving unit 106, the first receiving unit 105 comprising a first array of detectors, and the second receiving unit 106 comprising a second array of detectors. The first array of detectors and the second array of detectors can include various types of photodetectors, such as an avalanche photodiode (APD), a single photon avalanche diode (SPAD), or a silicon photomultiplier (SiPM). After the first detection laser beam L1 and the second detection laser beam L2 undergo diffuse reflection on the objects, a first echo L1' and a second echo L2' are respectively generated and return to the LiDAR, and are converged by a receiving lens 107 onto the first receiving unit 105 and the second receiving unit 106. The first receiving unit 105 and the second receiving unit 106 are configured to respectively receive the first echo L1' and the second echo L2' and convert them into electrical signals for signal processing and analysis in subsequent circuits. Among them, the first echo L1' and the second echo L2' respectively travel through different optical distances from the receiving lens 107 before reaching the first receiving unit 105 and the second receiving unit 106. For example, an optical distance which the first echo L1' travels through is, for example, greater than an optical distance which the second echo L2' travels through.

In order to enable the first echo L1' and the second echo L2' to respectively travel through different optical distances before reaching the first receiving unit 105 and the second receiving unit 106, the first receiving unit 105 and the second receiving unit 106 can be respectively disposed at different positions from the receiving lens 107. For example, the first array of detectors of the first receiving unit 105 can be disposed on a focal plane of the receiving lens 107, and a distance between the second array of detectors of the second receiving unit 106 and the receiving lens 107 can be set to be less than a focal length of the receiving lens 107.

According to one preferred embodiment of the present disclosure, as illustrated in FIG. 4*c*, the LiDAR 100, on the receiving side, further comprises a focus-changing lens 108 at the receiving end disposed between the second array of detectors of the second receiving unit 106 and the receiving lens 107. The second echo L2' is incident onto the second array of detectors after passing through the receiving lens 107 and the focus-changing lens 108 at the receiving end. As illustrated in FIG. 4*c*, the second echo L2' undergoes a certain change in its direction or divergence after passing through the focus-changing lens 108 at the receiving end, and then is incident onto the second array of detectors. Preferably, the second array of detectors of the second receiving unit 106 is located on a focal plane of a lens group formed by the focus-changing lens 108 at the receiving end and the receiving lens 107, and an equivalent focal length of the lens group formed by the focus-changing lens 108 at the receiving end and the receiving lens 107 is smaller than the focal length of the receiving lens 107.

Additionally, those skilled in the art can also conceive of using a microlens array (MLA) to implement the focus-changing lens 108 at the receiving end. For example, a microlens is disposed upstream of an optical path of each detector in the second array of detectors of the second receiving unit 106 to modulate the second echo L2'.

Additionally, FIGS. 4*a*, 4*b* and 4*c* are not only schematic diagrams of the LiDAR 100 according to one embodiment of the present disclosure, and FIG. 4*c* is also a schematic diagram of a coaxial arrangement of the first receiving unit 105 and the second receiving unit 106 on the receiving side. Both the first receiving unit 105 and the second receiving unit 106 are arranged along an optical axis O' of the receiving lens 107. Similarly, the coaxial arrangement of the first receiving unit 105 and the second receiving unit 106 can be implemented in different ways. For example, an opening can be made on the circuit board of the second receiving unit 106, and another opening can be made at the center of the focus-changing lens 108 at the receiving end. These openings allow the first echo L1' to pass through. Therefore, the first echo L1' is not modulated by the focus-changing lens 108 at the receiving end. In this case, the first array of detectors of the first receiving unit 105 can be disposed relatively densely, and located substantially in a middle position of the circuit board; and the second array of detectors of the second receiving unit 106 can be disposed relatively sparsely, and located substantially in an edge position of the circuit board.

Additionally, or alternatively, the second receiving unit 106 can also be divided into two parts spaced from each other, and the focus-changing lens 108 at the receiving end can also be divided into two parts spaced from each other. A middle spacing region of the second receiving unit 106 and a middle spacing region of the focus-changing lens 108 at the receiving end can be used for allowing the first echo L1' to pass through. Additionally, the aforesaid embodiments can also be combined by, for example, making an opening in the middle of the circuit board of the second receiving unit 106 and dividing the focus-changing lens 108 at the receiving end into two parts; or vice versa.

Additionally, those skilled in the art can also conceive of using a microlens array (MLA) to implement the focus-changing lens 108 at the receiving end. For example, a microlens is disposed upstream of an optical path of each detector in the second array of detectors of the second receiving unit 106, such that the second echo L2' passing through the receiving lens 107 is modulated by the microlens and then is incident onto the detector. In addition to this, there can also be other arrangement ways, which will be described in detail in the following embodiments.

The receiving lens 107 can adopt a typical design for a LiDAR for a long-range detection with a relatively large focal length, such that the first array of detectors of the first receiving unit 105 can be directly disposed at the focal plane of the receiving lens 107, which can conveniently achieve a high beam number and a high resolution within a small FOV range. One focus-changing lens 108 at the receiving end is added in the proximity of the second receiving unit 106. A focal length of the lens group formed by the focus-changing lens 108 at the receiving end and the receiving lens 107 is relatively small, which is smaller than the focal length of the receiving lens 107. Therefore, a large FOV can be achieved, and the height of the receiving surface of the detectors will not be very high, which thus can achieve a compact structure. According to one preferred embodiment of the present disclosure, the first array of detectors of the first receiving unit 105 for a long-range detection has a sensitivity higher than that of the second array of detectors of the second receiving unit 106 for a short-range detection.

The LiDAR illustrated in FIGS. 4*a*, 4*b* and 4*c* of the present disclosure is a LiDAR with a bifocal length structure, which enables the LiDAR 100 to implement the functions of a short-range detection with a large vertical FOV and a long-range detection with a small vertical FOV at the same time. The height of the LiDAR does not to significantly increase. Specifically, two transmitting units are disposed on the transmitting side of the LiDAR, which are respectively used for emitting the first detection laser beam (for long-range detection) and the second detection laser beam (for short-range detection). Two receiving units are disposed on the receiving side, which are respectively used for receiving echoes generated by the first detection laser beam and the second detection laser beam, i.e., for a long-range detection and a short-range detection, respectively. A transmit-receive pair is formed by one transmitting unit and one receiving unit (for long-range detection) and another transmit-receive pair is formed by the other transmitting unit and the other receiving unit (for short-range detection). These two pairs correspond to different focal lengths, thereby satisfying both a long-range detection and a short-range detection performances of the LiDAR in a compact structure.

Figure 5:
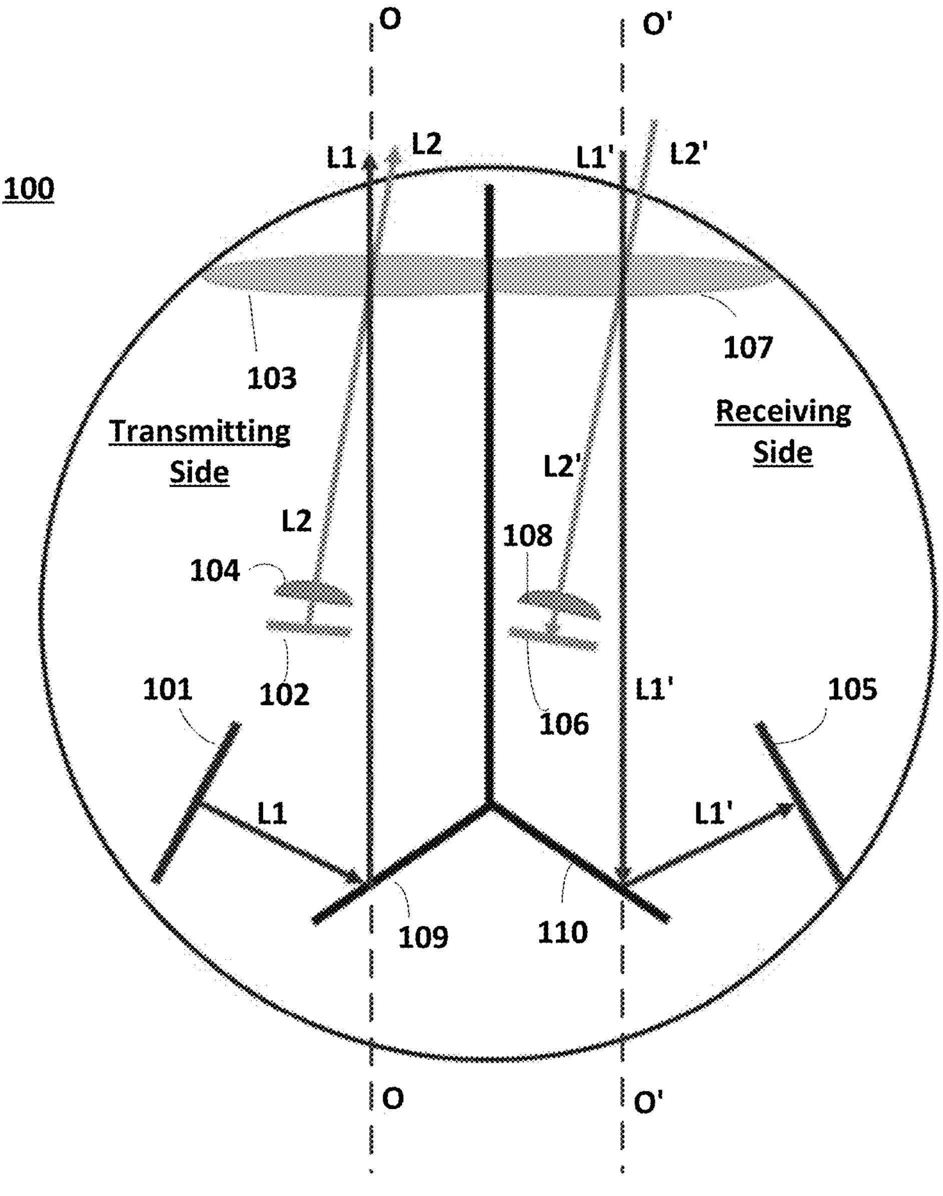
FIG. 5 illustrates a schematic top view of a LiDAR according to one embodiment of the present disclosure, which has a bifocal length structure.

FIG. 5 illustrates a schematic top view of a LiDAR 100 according to one embodiment of the present disclosure, which also has a bifocal length structure. Unlike FIGS. 4*a*, 4*b* and 4*c*, FIG. 5 illustrates non-coaxial arrangement of the first transmitting unit 101 and the second transmitting unit 102, which means that they are not arranged along the optical axis O of the transmitting lens 103. FIG. 5 also illustrates a non-coaxial arrangement of the first receiving unit 105 and the second receiving unit 106, which means that they are not arranged along the optical axis O' of the receiving lens 107. As illustrated in FIG. 5, on the transmitting side, the LiDAR 100 further comprises a mirror 109 at the transmitting end in addition to the first transmitting unit 101, the second transmitting unit 102, the transmitting lens 103 and the focus-changing lens at the transmitting end 104. The mirror 109 at the transmitting end is located between the first transmitting unit 101 and the transmitting lens 103 and used for receiving the first detection laser beam L1, such that the first detection laser beam L1, after being reflected by the mirror 109 at the transmitting end, exits through the transmitting lens 103. The second detection laser beam L2 emitted by the second transmitting unit 102 is modulated by the focus-changing lens at the transmitting end 104 and then exits through the transmitting lens 103. Preferably, as illustrated in FIG. 5, the second transmitting unit 102 and the focus-changing lens at the transmitting end 104 are disposed at such positions to: avoid the propagation path of the first detection laser beam L1; have both the first detection beam L1 and the second detection laser beam L2 point towards and exit the center of the lens; and cause the first detection beam L1 and the second detection laser beam L2 to have a relatively small angle difference in a horizontal direction (the direction of the surface of FIG. 5 is a horizontal direction, and the direction vertical to the surface is a vertical direction) (the angle difference is 0 in FIGS. 4*a*, 4*b* and 4*c*). Compared with the embodiments in FIGS. 4*a*, 4*b* and 4*c*, the embodiment in FIG. 5, by the arrangement of the mirror 109, can enable the structure on the transmitting side of the LiDAR to be more compact (a lower height).

Similarly, on the receiving side, the LiDAR 100 further comprises a mirror at the receiving end 110 in addition to the first receiving unit 105, the second receiving unit 106, the receiving lens 107 and the focus-changing lens 108 at the receiving end. The mirror 110 at the receiving end is located between the first receiving unit 105 and the receiving lens 107 and used for receiving the first echo L1', such that the first echo L', after being reflected by the mirror 110 at the receiving end, is incident onto the first receiving unit 105. The second echo L2' is incident onto the second receiving unit 106 after passing through the receiving lens 107 and the focus-changing lens 108 at the receiving end. Preferably, as illustrated in FIG. 5, the second receiving unit 106 and the focus-changing lens 108 at the receiving end are disposed at such positions to avoid the propagation path of the first echo L1'. By the arrangement of the mirror 110, the structure on the receiving side of the LiDAR can be made more compact. The first receiving unit 105 and the second receiving unit 106 can share a signal processing unit.

In the embodiment illustrated in FIG. 5, one mirror is respectively disposed on the transmitting and receiving sides of the LiDAR. The present disclosure is not limited to this, and a plurality of mirrors can also be arranged. Additionally, mirrors can also be arranged to change the directions of the second detection laser beam L2 and the second echo L2'. These all fall within the scope of protection of the present disclosure.

In the embodiment illustrated in FIG. 5, the array of lasers of the first transmitting unit 101 emits a light beam for a long-range measurement, which is reflected once by the mirror 109 at the transmitting end and then exits through the transmitting lens 103 (the main transmitting lens). After the light beam for the long-range measurement is reflected by an obstacle, an echo is received by the receiving lens 107 (the main receiving lens), then reflected once by the mirror 110 at the receiving end, then detected by the array of detectors of the first receiving unit 105, and then processed by a subsequent processing unit to obtain ranging data. The aforesaid detection process corresponds to a long-range, small-FOV detection.

The array of lasers of the second transmitting unit 102 emits a light beam for a short-range measurement, which passes through the focus-changing lens 104 at the transmitting end and then exits through the transmitting lens 103. After the light beam for the short-range measurement is reflected by an obstacle, an echo is received by the receiving lens 107, then detected by the array of detectors of the second receiving unit 106 after passing through the focus-changing lens 108 at the receiving end, and then processed by a subsequent processing unit to obtain ranging data. The aforesaid detection process corresponds to a short-range, large-FOV detection. The readout signals of the array of detectors of the first receiving unit 105 and the array of detectors of the second receiving unit 106 can share a signal processing unit.

Figure 6:
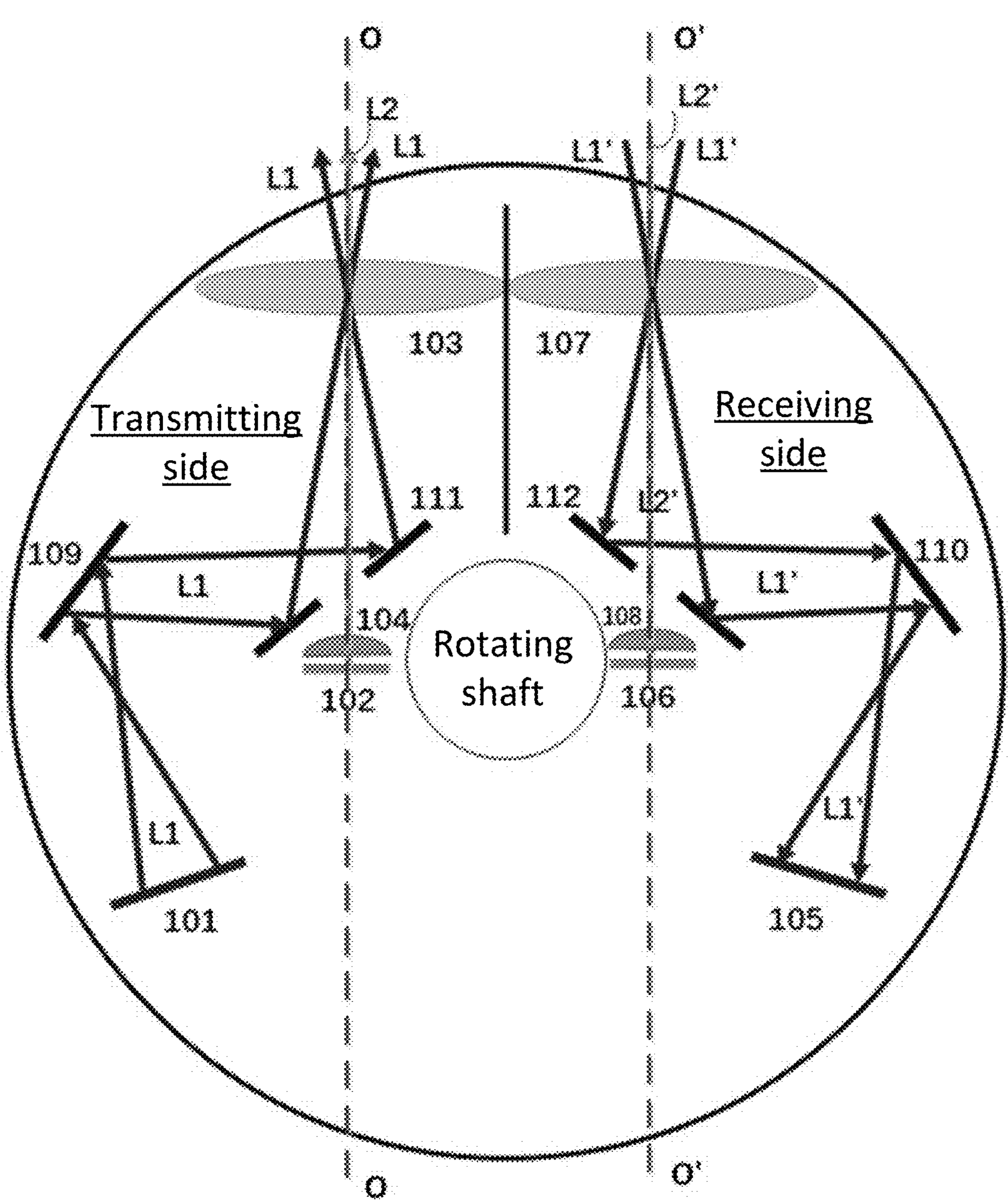
FIG. 6 illustrates a schematic diagram of a LiDAR according to another embodiment of the present disclosure, where there are a plurality of mirrors.

FIG. 6 illustrates a LiDAR according to another embodiment of the present disclosure. In FIG. 6, the first transmitting unit 101 and the second transmitting unit 102 are also arranged non-coaxially where the first transmitting unit 101 and the second transmitting 102 are not arranged along the optical axis O of the transmitting lens 103. The first receiving unit 105 and the second receiving unit 106 are also arranged non-coaxially, where the first receiving unit 105 and the second receiving unit 106 are not arranged along the optical axis O' of the receiving lens 107. Unlike the embodiment of FIG. 5, the LiDAR in the embodiment of FIG. 6 has a plurality of mirrors. As illustrated in FIG. 6, on the transmitting side of the LiDAR 100, in addition to the first transmitting unit 101, the second transmitting unit 102, the transmitting lens 103, and the focus-changing lens 104 at the transmitting end, the LiDAR 100 further comprises a first mirror 109 at the transmitting end and a second mirror 111 at the transmitting end. The first mirror 109 and the second mirror 111 are located in sequence between the first transmitting unit 101 and the transmitting lens 103, and used for reflecting the first detection laser beam L1. The first detection laser beam L1 is reflected by the first mirror 109 and the second mirror 111 in sequence, and then exits through the transmitting lens 103. The second detection laser beam L2 emitted by the second transmitting unit 102 exits through the transmitting lens 103 after being modulated by the focus-changing lens 104. Preferably, as illustrated in FIG. 6, the first mirror 109 is disposed at such a position to avoid the propagation path of the second detection laser beam L2, and the second mirror 111 is disposed on the propagation path of the second detection laser beam L2. An opening can be made on the second mirror 111 to allow the second detection laser beam L2 to pass therethrough, while the remaining positions of the second mirror 111 are used for reflecting the first detection laser beam L1, as illustrated in FIG. 6.

Similarly, on the receiving side, the LiDAR 100 further comprises a first mirror 110 and a second mirror 112 in addition to the first receiving unit 105, the second receiving unit 106, the receiving lens 107, and the focus-changing lens at the receiving end 108. The first mirror 110 and the second mirror 112 are located in sequence between the first receiving unit 105 and the receiving lens 107, and used for reflecting the first echo L1'. The first echo L1' is reflected by the second mirror 112 and the first mirror 110 in sequence, and then incident onto the first receiving unit 105. The second echo L2' is incident onto the second receiving unit 106 after passing through the receiving lens 107 and the focus-changing lens at the receiving end 108. Preferably, as illustrated in FIG. 6, the first mirror 110 is disposed at such a position to avoid the propagation path of the second echo L2', and the second mirror 112 is disposed on the propagation path of the second echo L2'. An opening can be made on the second mirror 112 to allow the second echo L2' to pass therethrough, while the remaining positions of the second receiving mirror 112 are used for reflecting the first echo L1', as illustrated in FIG. 6.

Figure 7A:
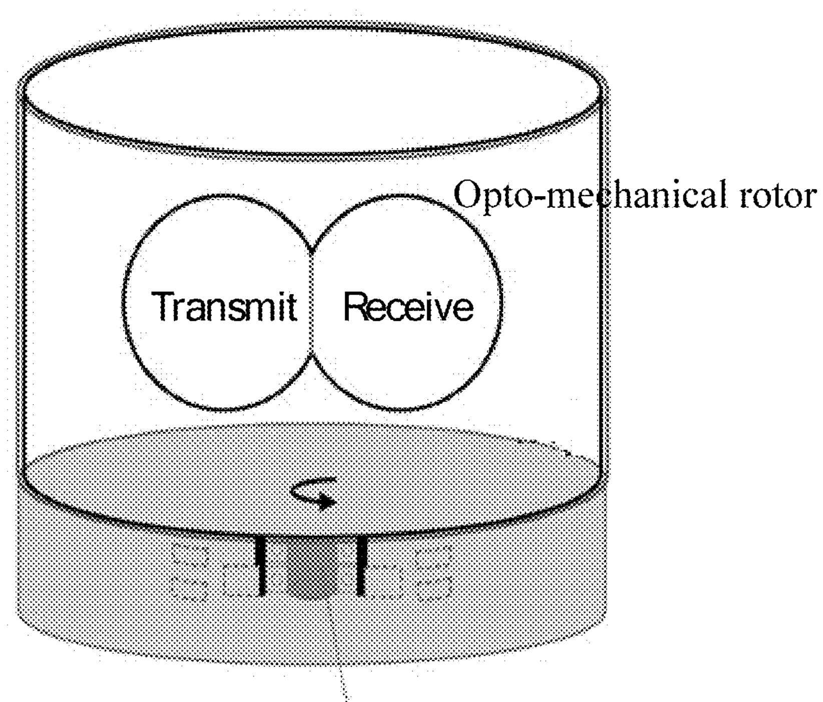
FIG. 7*a* illustrates a schematic diagram of a LiDAR with a non-through shaft.
Figure 7B:
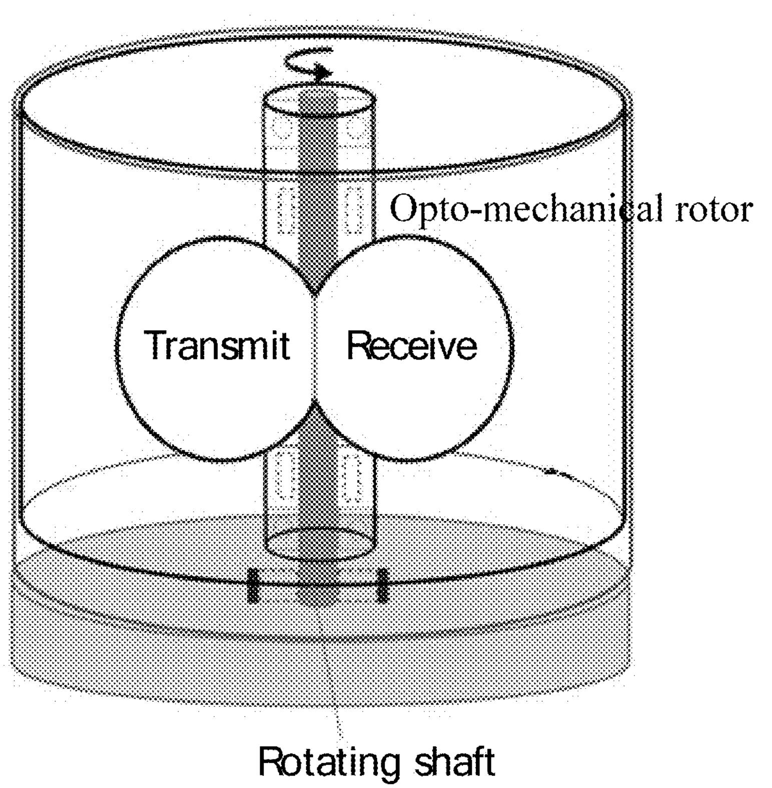
FIG. 7*b* illustrates a schematic diagram of a LiDAR with a through shaft.

According to one preferred embodiment of the present disclosure, as illustrated in FIG. 7, the LiDAR has a rotating shaft and an opto-mechanical rotor rotatable about the rotating shaft. The optical and electronic components on the transmitting and receiving ends of the LiDARs illustrated in FIGS. 4a, 4b, 4c, 5 and 6 are all integrated in the opto-mechanical rotor. As illustrated in FIG. 7a, the opto-mechanical rotor is disposed above the rotating shaft, which means that the rotating shaft of the LiDAR does not protrude through the opto-mechanical rotor. With such a non-through structure, the rotating shaft does not extend into the opto-mechanical rotor. Such a non-through structure can provide greater space for the opto-mechanical rotor to install optical and electronic components, or can reduce the volume of the opto-mechanical rotor and the volume of the LiDAR when the same elements and components are used. Certainly, the present disclosure is not limited to such a LiDAR with a non-through structure, and the rotating shaft of the LiDAR can also extend through the opto-mechanical rotor, as illustrated in FIG. 7b. Such through-shaft structure is more conducive to the rotational stability. These all fall within the scope of protection of the present disclosure. Particularly preferably, the LiDAR in the embodiment of FIG. 5 has a non-through-shaft structure, and the LiDAR in the embodiment of FIG. 6 has a through-shaft structure.

Figure 8:
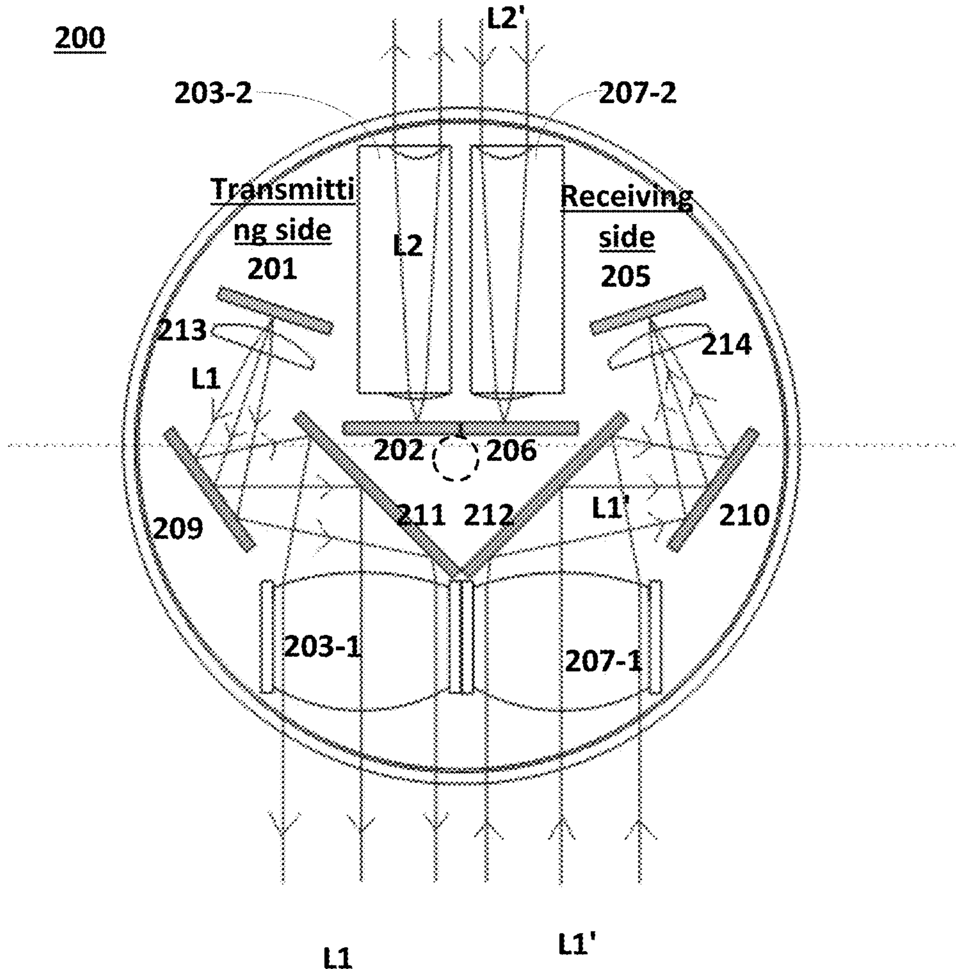
FIG. 8 illustrates a schematic diagram of a LiDAR according to another embodiment of the present disclosure.

FIG. 8 illustrates a LiDAR 200 according to another embodiment of the present disclosure. In the embodiment of FIG. 8, a first detection laser beam and a second detection laser beam emitted by a first transmitting unit and a second transmitting unit of the LiDAR respectively exit after passing through different transmitting lenses. Correspondingly, a first echo and a second echo are respectively received by a first receiving unit and a second receiving unit after passing through different receiving lenses. Similarly, a transmit-receive pair is formed by the first transmitting unit and the first receiving unit (for a long-range detection) and another transmit-receive pair is formed by the second transmitting unit and the second receiving unit (for a short-range detection). These two pairs correspond to different focal lengths, as described below in detail referring to FIG. 8.

As illustrated in FIG. 8, the LiDAR 200 on the transmitting side comprises a first transmitting unit 201 and a second transmitting unit 202, which are configured to respectively emit a first detection laser beam L1 and a second detection laser beam L2 to detect objects. An optical assembly at the transmitting end comprises a first transmitting lens 203-1 and a second transmitting lens 203-2, used respectively for modulating the first detection laser beam L1 and the second detection laser beam L2, and then enabling them to exit to the outside of the LiDAR 200. Additionally, the LiDAR 200 on the transmitting side further comprises a first mirror 209 and a second mirror 211 at the transmitting end, disposed in sequence between the first transmitting unit 201 and the first transmitting lens 203-1, and used for reflecting the first detection laser beam L1 in sequence. Those skilled in the art readily understand that the first mirror 209 and the second mirror 211 are not necessary, and it is also possible that no mirror is installed at the transmitting ends, or that other numbers of mirrors at the transmitting ends can be provided as long as the requirements of an optical path and the layout requirements of a mechanical structure can be met. In FIG. 8, the second detection laser beam L2 emitted by the second transmitting unit 202 is directly incident onto the second transmitting lens 203-2, and exits after modulation (e.g., collimation). One or more mirrors can also be disposed between the second transmitting unit 202 and the second transmitting lens 203-2. These all fall within the scope of protection of the present disclosure. As illustrated in FIG. 8, the first transmitting lens 203-1 and the second transmitting lens 203-2 are disposed at substantially 180 degrees in opposite sides about the rotating shaft of the LiDAR (as illustrated by the black circle in FIG. 8). With the structure in FIG. 8, the optical path structure used for a short-range detection and the optical path structure used for a long-range detection are independent of each other. Compared with the structures of the preceding embodiments, the structure in FIG. 8 may be installed and adjusted in a more convenient manner. Additionally, the relative arrangement at 180 degrees can facilitate design and subsequent signal processing, and the data of short-range and long-range detections have an angle difference of 180 degrees in the horizontal direction. The first transmitting unit 201 is arranged, for example, on a focal plane of the first transmitting lens 203-1, and the second transmitting unit 202 is arranged, for example, on a focal plane of the second transmitting lens 203-2.

As illustrated in FIG. 8, the LiDAR 200 on the receiving side comprises a first receiving unit 205 and a second receiving unit 206, which are configured to respectively receive a first echo L1' and a second echo L2' of the first detection laser beam L1 and second detection laser beam L2 reflected by the objects, and convert them into electrical signals. A optical assembly at the receiving end comprises a first receiving lens 207-1 and a second receiving lens 207-2, used respectively for receiving the first echo L1' and the second echo L2'. As illustrated in FIG. 8, the first receiving lens 207-1 can be arranged next to the first transmitting lens 203-1, and the second receiving lens 207-2 can be arranged next to the second transmitting lens 203-2. Additionally, the LiDAR 200 on the receiving side further comprises a first mirror 210 and a second mirror 212 at the receiving end, disposed in sequence between the first receiving unit 205 and the first receiving lens 207-1, and used for reflecting the first echo L1' in sequence. Those skilled in the art readily understand that the first mirror 210 and the second mirror 212 are not necessary, and it is also possible that no mirror is installed at the receiving ends, or that other numbers of mirrors at the receiving ends can be provided as long as the requirements of an optical path and the layout requirements of a mechanical structure can be met. In FIG. 8, the second echo L2' is directly converged to the second receiving unit 206 after passing through the receiving lens 207-2, and converted into an electrical signal. One or more mirrors can also be disposed between the second receiving unit 206 and the second receiving lens 207-2. These all fall within the scope of protection of the present disclosure. As illustrated in FIG. 8, the first receiving lens 207-1 and the second receiving lens 207-2 are disposed at substantially 180 degrees at opposite sides about the rotating shaft of the LiDAR (as illustrated by the black circle in the center of FIG. 8). The first receiving unit 205 is arranged, for example, on a focal plane of the first receiving lens 207-1, and the second receiving unit 206 is arranged, for example, on a focal plane of the second receiving lens 207-2. The LiDAR 200 illustrated in FIG. 8 can be in a through-shaft structure, or in a non-through-shaft structure, and preferably in a non-through-shaft structure.

As illustrated in FIG. 8, the first detection laser beam L1 and the second detection laser beam L2 respectively exit from the first transmitting unit 201 and the second transmitting unit 202, and travel through different optical distances before reaching the first transmitting lens 203-1 and the second transmitting lens 203-2. The first echo and the second echo respectively travel through different optical distances from the receiving lens before reaching the first receiving unit and the second receiving unit.

In the embodiment of FIG. 8, the first transmitting lens 203-1, for example, has a relatively large focal length, and the first receiving lens 207-1, for example, has a relatively large focal length, both of which are combined with the first transmitting unit 201 and the first receiving unit 205 for a long-range, small-FOV detection. The second transmitting lens 203-2, for example, has a relatively small focal length, and the second receiving lens 207-2, for example, has a relatively small focal length, both of which are combined with the second transmitting unit 202 and the second receiving unit 206 for a short-range, large-FOV detection.

According to one preferred embodiment of the present disclosure, the lasers in the first transmitting unit 201 and the second transmitting unit 202 include a vertical cavity surface emitting laser (VCSEL) configured to emit light in a direction vertical to a PCB. The detectors (arrays) in the first receiving unit 205 and the second receiving unit 206, for example, include a single photon detector, such as SiPM or SPAD array. Additionally, photoelectric devices used for a short-range detection and photoelectric devices used for a long-range detection can share a rotating platform for performing power supply and signal transmission in a wireless manner. Preferably, in the embodiment illustrated in FIG. 8, the LiDAR 200 is in a non-through-shaft structure (as illustrated in FIG. 7*a*), in which the rotating shaft of the LiDAR does not protrude from the rotor, in order to increase the space of the rotor to accommodate the short-range measuring module and the long-range measuring module.

Figure 9:
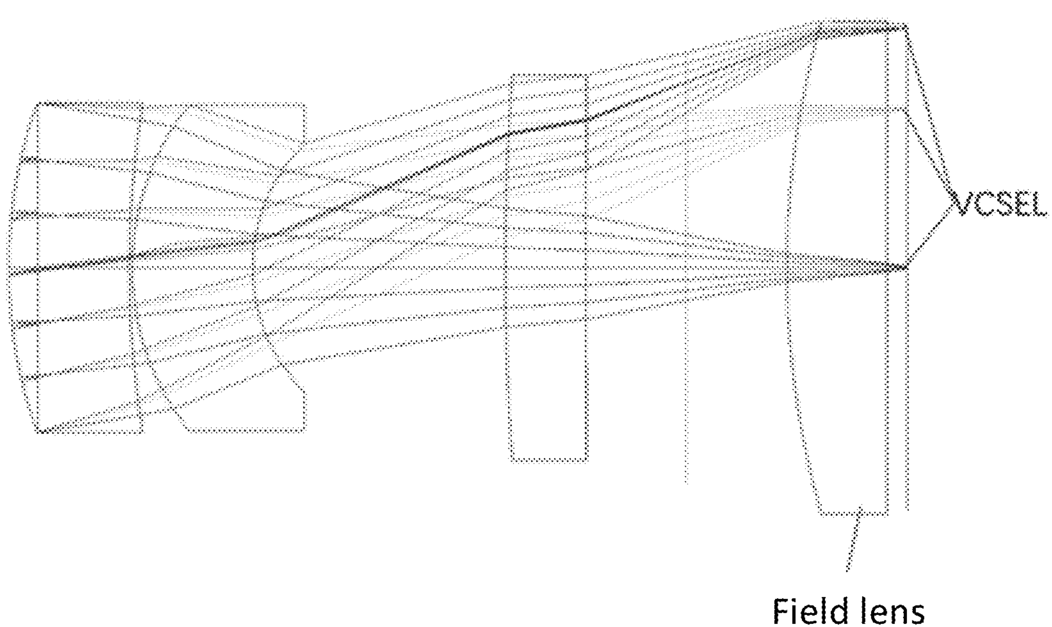
FIG. 9 illustrates a telecentric lens group for a LiDAR according to one embodiment of the present disclosure.

According to one preferred embodiment of the present disclosure, the first transmitting lens 203-1 and the first receiving lens 207-1 are preferably a telecentric lens group, for example, as illustrated in FIG. 9, which can reduce the overall lens height and make the structure more compact. A first field lens 213 can be disposed downstream of the optical path of the first transmitting unit 201 in the proximity of the focal plane of the first transmitting lens 203-1, and a second field lens 214 can be disposed upstream of the optical path of the first receiving unit 205 in the proximity of the focal plane of the first receiving lens 207-1. By disposing the first field lens 213 and the second field lens 214, the optical paths can be pulled back onto the optical axis. Meanwhile, the first transmitting lens 203-1 and the first receiving lens 207-1 for a long-range detection have a long focal length, and a small vertical field of view, while the second transmitting lens 203-2 and the second receiving lens 207-2 for a short-range detection have a short focal length, and a large vertical field of view. However, the focal plane heights of the two can be relatively close. Therefore, the height difference between the optical paths for a long-range detection and a short-range detection is not significant, enabling the overall height of the LiDAR to be very compact and reasonable.

Figure 10A:
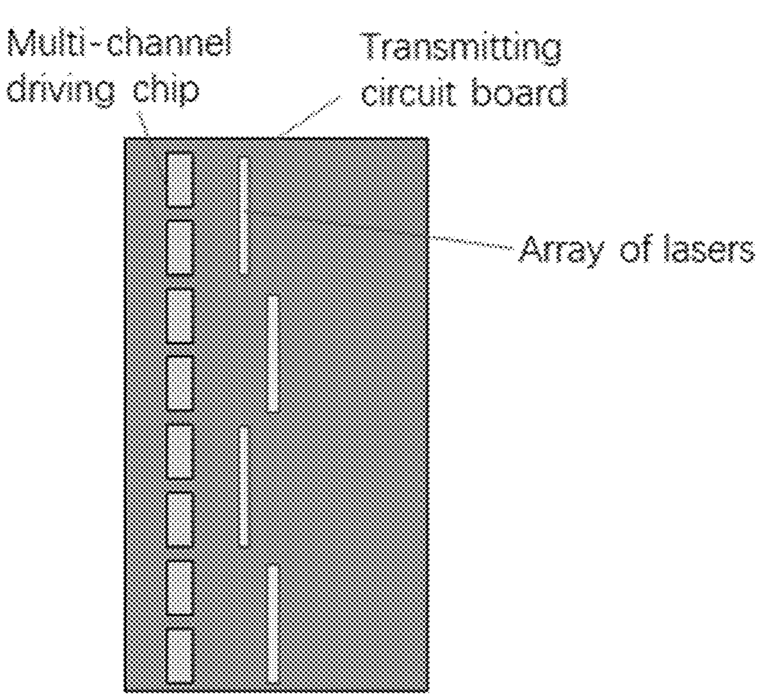
FIG. 10*a* illustrates a transmitting unit according to one embodiment of the present disclosure.
Figure 10B:
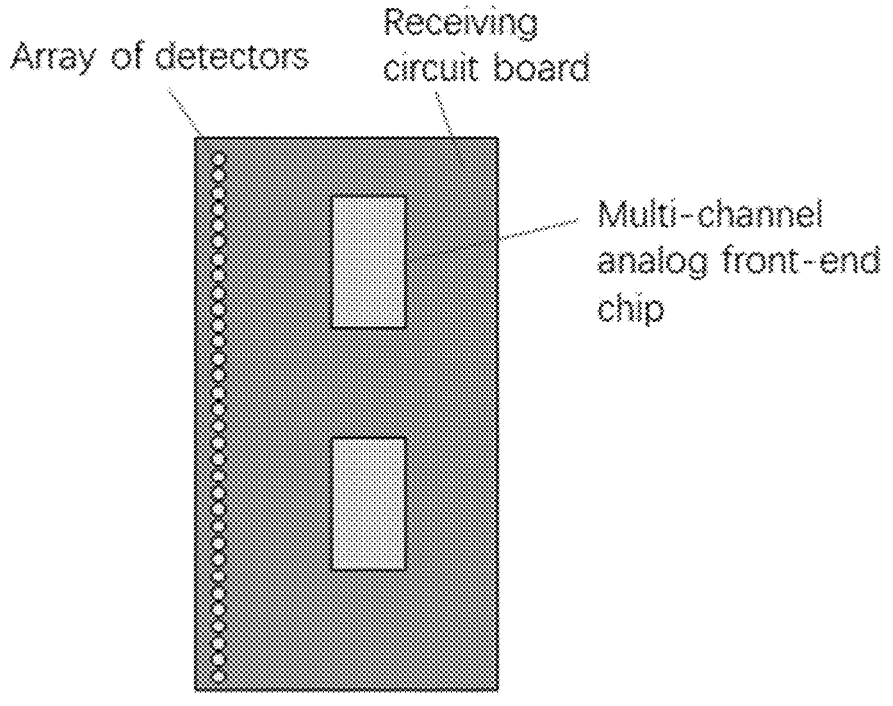
FIG. 10*b* illustrates a receiving unit according to one embodiment of the present disclosure.

Additionally, preferably, the driving circuits of the array of lasers of the first transmitting units 101, 201 and the second transmitting units 102, 202 can be integrated on a chip (a multi-channel driving chip) respectively. For example, when the array of lasers includes 8 lasers, with the driving circuits of every 4 lasers integrated onto one multi-channel driving chip, the array of lasers thus correspond to two multi-channel driving chips, and a plurality of lasers and the corresponding multi-channel driving chips are disposed on the same PCB, as illustrated in FIG. 10*a*. Preferably, the readout circuits of the array of detectors of the first receiving units 105, 205 and the second receiving units 106, 206 are also integrated to a chip (a multi-channel analog front-end chip). For example, when the array of detectors includes 32 detectors, with the readout circuits of every 16 detectors integrated to one multi-channel analog front-end chip, the array of detectors thus correspond to two multi-channel analog front-end chips, and a plurality of detectors and the multi-channel analog front-end chips are disposed on the same PCB, as illustrated in FIG. 10*b*. In this way, the space occupied by the circuit part in the rotor can be further reduced, which is more conducive to accommodating the short-range and long-range measuring modules, enabling the LiDAR structure to be more compact.

The LiDAR of the present disclosure can also comprise a data processing unit coupled with the first and second transmitting units and the first and second receiving units, and configured to fuse detection results of the first and second detection laser beams to generate a point cloud.

As can be seen from the aforesaid embodiments, the present disclosure adopts a bifocal length separation design, which provides both a long-range detection at a high resolution and small FOV, and a short-range detection at a low resolution and large FOV. At the same time, the bifocal length separation design allows the heights of the lasers and detectors not to be increased significantly, and the structure to be compact, being conducive to the installation of the LiDAR on a vehicle.

The LiDAR according to the embodiment of the present disclosure integrates both a large-FOV, short-range detection and a small-FOV, long-range detection. By adopting a focus-changing structure, a large-FOV, short-range detector is not necessarily at the same focal length as a long-range detector, thereby enabling the height of the detector panel to be reduced greatly. For the solution of sharing a main lens, light beams of the two short-range and long-range detections are emitted from the same set of transmit-receive main lenses. Therefore, the horizontal angle difference between the short-range and long-range detections will be very small, the time difference between the short-range and long-range detections in scanning the same object will be very small, and the point clouds of the short-range and long-range detections will be fused more easily.

The present disclosure proposes a solution that can satisfy both a small-FOV, long-range detection and a large-FOV, short-range detection. For a large-FOV, short-range detector, a focus-changing structure is adopted, so that it does not need to be at the same focal length as a long-range detector, thereby greatly reducing the height of the large-FOV, short-range detector panel, and thereby enabling the height of the LiDAR not necessarily to be made very high and increasing the compactness of the overall structure.

Last but not least, it is noted that described above are just preferred embodiments of the present disclosure, which are not used to limit the present disclosure. Although the detailed description of the present disclosure has been provided with reference to the foregoing embodiments, those skilled in the art can still make modifications to the technical solution as recited in each of the foregoing embodiments, or conduct equivalent replacement of some technical features therein. Any modification, equivalent replacement, or improvement, if falling into the spirit and principles as stated herein, should be included in the scope of protection of the present disclosure.

We claim:

1. A LIDAR, comprising:

a first transmitting unit and a second transmitting unit configured to emit a first detection laser beam and a second detection laser beam, respectively;

a transmitting optical assembly disposed at a transmitting end and comprising a transmitting lens, the transmitting optical assembly further comprising a focus-changing transmitting lens disposed in a second optical path of the second detection laser beam and outside a first optical path of the first detection laser beam;

a receiving optical assembly disposed at a receiving end comprising a receiving lens; and a first receiving unit and a second receiving unit configured to receive a first echo of the first detection laser beam and a second echo of the second detection laser beam, respectively, and convert the first echo and the second echo into electrical signals, wherein a first transmitting optical distance traveled by the first detection laser beam between the first transmitting unit and the transmitting lens is different from a second transmitting optical distance traveled by the second detection laser beam between the second transmitting unit and the transmitting lens; and wherein a first receiving optical distance traveled by the first echo between the receiving lens and the receiving unit is different from a second receiving optical distance traveled by the second echo between the receiving lens and the second receiving unit.

2. The LiDAR of claim 1, wherein the first transmitting unit and the second transmitting unit are respectively disposed at different positions from the transmitting lens, and the first receiving unit and the second receiving unit are respectively disposed at different positions from the receiving lens.

3. The LiDAR of claim 1, wherein the first transmitting unit comprises a first array of lasers disposed on a focal plane of the transmitting lens; the second transmitting unit comprises a second array of lasers, a distance between the second array of lasers and the transmitting lens being less than a focal length of the transmitting lens; and wherein the first receiving unit comprises a first array of detectors disposed on a focal plane of the receiving lens; and the second receiving unit comprises a second array of detectors, a distance between the second array of detectors and the receiving lens being less than a focal length of the receiving lens.

4. The LiDAR of claim 1, wherein the second transmitting unit comprises the focus-changing transmitting lens disposed between the second array of lasers and the transmitting lens, the second detection laser beam passing through the focus-changing transmitting lens and the transmitting lens; and wherein the second receiving unit comprises a focus-changing receiving lens at the receiving end, disposed between the second array of detectors and the receiving lens, the second echo passing through the receiving lens and the focus-changing receiving lens.

5. The LiDAR of claim 4, further comprising a transmitting mirror at the transmitting end a receiving mirror at the receiving end, the first detection laser beam being reflected by the transmitting mirror and then exiting through the transmitting lens, and the first echo being reflected by the receiving mirror and then being incident onto the first array of detectors.

6. The LiDAR of claim 5, wherein the transmitting mirror comprises an opening, wherein the first detection laser beam is reflected by the transmitting mirror, and the second detection laser beam passes through the opening; and wherein the receiving mirror comprises an opening, wherein the first echo is reflected by the receiving mirror, and the second echo passes through the opening of the receiving mirror.

7. The LiDAR of claim 1, wherein the LiDAR has a rotating shaft and an opto-mechanical rotor rotatable about the rotating shaft, the opto-mechanical rotor comprising the first transmitting unit, the second transmitting unit, the transmitting optical assembly, the receiving optical assembly, the first receiving unit, and the second receiving unit, and wherein the opto-mechanical rotor is disposed above the rotating shaft, or the rotating shaft extends through the opto-mechanical rotor.

8. A LiDAR, comprising:

a first transmitting unit and a second transmitting unit configured to emit a first detection laser beam and a second detection laser beam, respectively;

a transmitting optical assembly disposed at a transmitting end and comprising a focus-changing transmitting lens disposed in a second optical path of the second detection laser beam and outside a first optical path of the first detection laser beam;

a receiving optical assembly disposed at a receiving end; and a first receiving unit and a second receiving unit configured to receive a first echo of the first detection laser beam and a second echo of the second detection laser beam, respectively, and convert the first echo and the second echo into electrical signals, wherein the transmitting optical assembly further comprises a first transmitting lens and a second transmitting lens, and the receiving optical assembly comprises a first receiving lens and a second receiving lens, the first detection laser beam exiting through the first transmitting lens, and the second detection laser beam exiting through the second transmitting lens;

and the first echo being converged to the first detection unit through the first receiving lens, and the second echo being converged to the second detection unit through the second receiving lens.

9. The LiDAR of claim 8, wherein the LiDAR has a rotating shaft, the first transmitting lens and the second transmitting lens being disposed at substantially 180 degrees at opposite sides about the rotating shaft, and the first receiving lens and the second receiving lens being disposed at substantially 180 degrees at opposite sides about the rotating shaft.

10. The LiDAR of claim 8, wherein the first transmitting lens and the first receiving lens comprise a telecentric lens group.

11. The LiDAR of claim 8, wherein the first detection laser beam and the second detection laser beam correspond to different ranges of vertical fields of view of the LiDAR.

12. The LiDAR of claim 8, wherein an energy of the first detection laser beam is higher than that of the second detection laser beam.

13. The LiDAR of claim 8, wherein each of the first transmitting unit and the second transmitting unit comprises a plurality of lasers disposed on a plurality of multi-channel driving chips, the plurality of lasers and multi-channel driving chips being disposed on a same PCB; and wherein each of the first receiving unit and the second receiving unit comprises a plurality of detectors disposed on a plurality of multi-channel front-end chips, the plurality of detectors and multi-channel front-end chips being disposed on a same PCB.

14. The LiDAR of claim 8, further comprising a data processing unit coupled with the first transmitting unit, the second transmitting unit, the first receiving unit, and the second receiving unit, and wherein the data processing unit is configured to fuse detection results of the first detection laser beam and the second detection laser beam to generate a point cloud.

15. The LiDAR of claim 1, wherein the transmitting optical assembly and the receiving optical assembly comprise a telecentric lens group.

16. The LiDAR of claim 1, wherein the first detection laser beam and the second detection laser beam correspond to different ranges of vertical fields of view of the LiDAR.

17. The LiDAR of claim 1, wherein an energy of the first detection laser beam is higher than that of the second detection laser beam.

18. The LiDAR of claim 1, wherein each of the first transmitting unit and the second transmitting unit comprises a plurality of lasers disposed on a plurality of multi-channel driving chips, the plurality of lasers and multi-channel driving chips being disposed on a same PCB; and wherein each of the first receiving unit and the second receiving unit comprises a plurality of detectors disposed on a plurality of multi-channel front-end chips, the plurality of detectors and multi-channel front-end chips being disposed on a same PCB.

19. The LiDAR of claim 1, further comprising a data processing unit coupled with the first transmitting unit, the second transmitting unit, the first receiving unit, and the second receiving unit, and wherein the data processing unit is configured to fuse detection results of the first detection laser beam and the second detection laser beam to generate a point cloud.

* * * * *